United States Patent
Wolfson et al.

(10) Patent No.: US 6,920,233 B2
(45) Date of Patent: Jul. 19, 2005

(54) METHOD AND APPARATUS FOR SHORT-TERM PREDICTION OF CONVECTIVE WEATHER

(75) Inventors: Marilyn Wolfson, Acton, MA (US); Richard Johnson, Harvard, MA (US); Barbara Forman, Framingham, MA (US); William Dupree, Westborough, MA (US); Kim E. Theriault, Pelham, MA (US); Robert Boldi, Sudbury, MA (US); Carol Wilson, Acton, MA (US); Robert G. Hallowell, Nashua, NH (US); Richard L. Delanoy, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 688 days.

(21) Appl. No.: 10/079,995

(22) Filed: Feb. 19, 2002

(65) Prior Publication Data

US 2002/0114517 A1 Aug. 22, 2002

Related U.S. Application Data

(60) Provisional application No. 60/269,955, filed on Feb. 20, 2001.

(51) Int. Cl.[7] .................................................. G06K 9/00
(52) U.S. Cl. .................... 382/100; 382/107; 382/263; 382/264; 382/284; 342/26 R; 702/3; 73/170.16
(58) Field of Search ......................... 382/100, 107, 382/260, 263, 264, 272, 273, 284, 298, 224; 702/3; 73/170.16; 348/85; 356/369, 241.1; 345/629; 340/601; 342/26 R

(56) References Cited

U.S. PATENT DOCUMENTS 5,255,190 A * 10/1993 Sznaider ........................ 702/3
5,517,193 A * 5/1996 Allison et al. ............ 342/26 R
5,572,635 A * 11/1996 Takizawa et al. ........... 345/426
5,583,972 A * 12/1996 Miller ........................ 345/419
5,959,567 A   9/1999 Wolfson et al. ............... 342/26
6,035,710 A * 3/2000 Hutchison et al. ....... 73/170.16
6,128,578 A * 10/2000 Sakaino et al. ................. 702/3
6,281,969 B1 * 8/2001 Gelbwachs ................ 356/5.01
6,307,500 B1 * 10/2001 Cornman et al. ......... 342/26 R
6,340,946 B1   1/2002 Wolfson et al. ............... 342/26
6,670,908 B2 * 12/2003 Wilson et al. ............ 342/26 R
6,683,609 B1 * 1/2004 Baron et al. ................ 345/419
6,778,929 B2 * 8/2004 Egi ............................. 702/104
6,850,630 B1 * 2/2005 Barbaresco et al. ........ 382/107
2001/0017623 A1 * 8/2001 Baron et al. ................ 345/419
2002/0080038 A1 * 6/2002 Smith ......................... 340/601
2002/0113826 A1 * 8/2002 Chuang ....................... 345/835
2004/0100476 A1 * 5/2004 Morita et al. ............... 345/619
2005/0012035 A1 * 1/2005 Miller ......................... 250/226

FOREIGN PATENT DOCUMENTS

EP         0 851 240 A2    7/1998
JP         2000009857      1/2000   .......... G01W/1/14
WO         01/35121 A1     5/2001

OTHER PUBLICATIONS

Chornoboy et al., "Automated Storm Tracking for Terminal Air Traffic Control," *The Lincoln Laboratory Journal*, vol. 7, No. 2, pp. 427–448 (1994).

(Continued)

Primary Examiner—Bhavesh M. Mehta
Assistant Examiner—Barry Choobin
(74) Attorney, Agent, or Firm—Guerin & Rodriguez, LLP; William G. Guerin

(57) ABSTRACT

A method and apparatus for forecasting the likely occurrence of convective weather events, such as thunderstorms. An image filter is used to identify areas of interest within a meteorological image that are likely to contain convective weather. The image filter and an image difference processor identify areas within the meteorological image that are likely to experience a growth and/or decay of weather events. The meteorological image, interest image and growth/decay image are processed to produce the short-term forecast.

51 Claims, 7 Drawing Sheets

OTHER PUBLICATIONS

Cartwright et al., *The FAA Terminal Convective Weather Forecast Product: Scale Separation Filter Optimization* 29th International Conference on Radar Meteorology, Montreal, Quebec (1999), pp. 852–855.

Dixon et al., *TITAN: Thunderstorm Identification, Tracking, Analysis, and Nowcasting–A Radar–Based Methodology* American Meteorological Society, vol. 10 (1993), pp. 785–797.

Forman et al., *Aviation User Needs for Convective Weather Forecasts* 8th Conference on Aviation Meteorology, Dallas, TX (1999), pp. 526–530.

*Gandi: Growth AND Initiation*, Personal communication with Wilson et al., at the National Center for Atmospheric Research (Feb. 2001).

Hand et al., *An Object–Oriented Approach to Nowcasting Showers Weather and Forecasting*, vol. 10 (1995), pp. 327–341.

Mueller et al., *Evaluation of the NCAR Thunderstorm Auto–Nowcast System American Meteorological Society* 9th Conference on Aviation Range and Aerospace Meterology (AROM) / 20th Conference on Severe Local Storms (SLS) Joint Session (2001).

Peak et al., *Toward Automated Interpretation of Satellite Imagery for Navy Shipboard Applications Bulletin of the American Meteorological Society*, vol. 73, No. 7 (1992), pp. 995–1008.

Pierce et al., *GANDOLF: a System for Generating Automated Nowcasts of Convective Precipitation Meteorological Applications*, vol. 7 (2000), pp. 341–360.

Roberts, *Detecting and Forecasting Cumulus Cloud Growth Using Radar and Multi–Spectral Satellite Data* 28th Conference on Radar Meteorology, Austin TX, American Meteorological Society (1997), pp. 408–409.

Theriault et al., *FAA Terminal Convective Weather Forecast Algorithm Assessment American Meteoological Society* 9th Conference on Aviation Range and Aerospace Meterorology (AROM)/ 20th Conference on Severe Local Storms (SLS) Joint Session (2001).

Wilson et al., *Nowcasting Thunderstorms: A Status Report, Bulletin of the American Meteorological Society*, vol. 79, No. 10 (Oct. 1998), pp. 2080–2099.

Wolfson et al., *The Growth and Decay Storm Tracker,* 8th Conference on Aviation Meteorology, Dallas, TX (1999), pp. 58–62.

* cited by examiner

METHOD AND APPARATUS FOR SHORT-TERM PREDICTION OF CONVECTIVE WEATHER

CROSS-REFERENCE TO RELATED APPLICATIONS

This application claims the benefits of U.S. Provisional Application Ser. No. 60/269,955 filed on Feb. 20, 2001.

STATEMENT REGARDING FEDERALLY SPONSORED RESEARCH OR DEVELOPMENT

The subject matter described herein was supported in part under Contract Number F19628-00-C-0002 awarded by the U.S. Department of the Air Force.

FIELD OF THE INVENTION

The invention relates generally to weather image processing and more specifically to image processors that generate short-term predictions of convective weather based on determination of the growth and decay of convective weather events.

BACKGROUND OF THE INVENTION

Short-term weather predictions (e.g., 10–120 minutes) of the location and severity of storms are extremely important to many sectors of the population. For example, aviation systems, traffic information systems, power companies and commuters realize important safety and economic benefits from accurate predictions of storms. Short-term forecasts are particularly important for convective storms, such as thunderstorms, in which individual cells can exhibit a life-cycle less than the short-term forecast period. The challenge for any short-term forecaster is generating a forecast that is both accurate and reliable.

Some methods of generating short-term convective weather forecasts are partially automated, relying on operator invention. These approaches can offer acceptable predictabilities, however, can require significant operator interaction. As with any application relying on operator intervention, there is a possibility that human error can result in inaccurate forecasts.

Other methods of generating short-term convective weather forecast require little or no operator intervention. Unfortunately, the accuracy and reliability of these systems is generally insufficient for many applications. Fully-automated systems often "over predict" severe weather events. Such forecasts can exaggerate storm intensity and spatial extent. For applications, such as air traffic control, an over prediction can result in rerouting air traffic unnecessarily, resulting in undesirable inefficiencies, including longer flight times and additional fuel consumption.

SUMMARY OF THE INVENTION

In general, the present invention relates to an automated weather forecaster processing meteorological images from remotely sensed weather indicators to estimate the short-term growth and decay of convective meteorological events, such as thunderstorms. The present invention overcomes many of the disadvantages of prior art systems by providing a fully-automated system that provides substantial improvements in accuracy and reliability.

Accordingly, in a first aspect, the invention relates to a process for a computer-assisted prediction of near-term development of convective meteorological events including the steps of determining a difference image by advecting a first meteorological image and combining the advected first meteorological image and a second meteorological image. The first and second meteorological images include data indicative of a first forecast parameter at a first time and a second time, respectively. The process further includes the steps of generating an interest image including a region of interest by filtering a third meteorological image and generating a growth image indicative of the occurrence of a convective meteorological event by combining the difference image and the interest image. The term growth as used herein indicates both positive growth and negative growth (i.e., decay).

In one embodiment the step of determining the difference image includes subtracting the advected first meteorological image from the second meteorological image. In another embodiment the difference image is determined by averaging a plurality of preliminary difference images. In yet another embodiment the step of generating the interest image includes filtering the third meteorological image to generate a large-scale-feature image and a small-scale-feature image.

In one embodiment the step of filtering the large-scale-feature image comprises low-pass filtering the third meteorological image. In another embodiment the step of low-pass filtering comprises neighborhood-average filtering. In another embodiment the step of filtering the small-scale-feature image comprises high-pass filtering the third meteorological image. In another embodiment the step of high-pass filtering comprises neighborhood-standard-deviation filtering.

In one embodiment the step of generating the interest image further includes generating a peakiness image identifying cloud peaks indicative of convective weather. In another embodiment the step of generating the peakiness image includes the steps of subtracting the large-scale, or average, meteorological image from the third meteorological image.

In one embodiment, generating a forecast includes the additional steps of combining the growth image and the first meteorological image to generate a forecast image identifying the likelihood of convective meteorological events at a third time and advecting the combined image to the third time. In another embodiment, generating a forecast includes the additional step of classifying weather elements of the first meteorological image, the classifications can be one or more from the group including lines, stratiform regions, large cells, and small cells.

In another aspect, the invention relates to a process for a computer-assisted prediction of near-term development of convective meteorological events including the steps of determining a difference image by advecting a first precipitation image, and combining the advected first precipitation image and a second precipitation image, the first and second precipitation images indicative of precipitation at a first time and a second time, respectively; generating an interest image including a region of interest by filtering the second precipitation image; and generating a growth image indicative of the occurrence of a convective meteorological event by combining the difference image with the interest image.

In one embodiment the step of combining the advected first precipitation image and the second precipitation image includes subtracting the manipulated first precipitation image from the second precipitation image. In another embodiment the precipitation image includes data representative of vertically integrated liquid (VIL) water content. In another embodiment the step of generating the interest image includes filtering the first precipitation image to generate a large-scale-feature image; and filtering the first precipitation image to generate a small-scale-feature image. In another embodiment the step of filtering the large-scale-feature image comprises low-pass filtering the first precipitation image. In another embodiment the step of filtering the small-scale-feature image comprises high-pass filtering the first precipitation image. Another embodiment includes the additional steps of generating a forecast image identifying the likelihood of convective meteorological events at a third time by combining the growth image and a current precipitation image; and advecting the combined image to the third time.

In one embodiment, generating a forecast includes the additional steps of advecting a growth image according to a first advection field; advecting a current precipitation image according to a second advection field, and combining the advected growth image and advected current precipitation image to generate a forecast image.

In another aspect, the invention relates to a process for a computer-assisted prediction of near-term development of convective meteorological events including the steps of determining a difference image by advecting a first infrared meteorological image and combining the advected first infrared image and a second infrared meteorological image, the first and second infrared meteorological images are indicative of cloud temperature at a first time and a second time, respectively, generating an interest image including a region of interest by filtering a satellite visible meteorological image, and generating a growth image indicative of the occurrence of a convective meteorological event by combining the difference image and the interest image.

In one embodiment the step of combining the advected first infrared meteorological image and the second infrared meteorological image includes subtracting the another embodiment the step of generating the interest image includes filtering the satellite visible meteorological image to generate a large-scale-feature image and filtering the satellite visible meteorological image to generate a small-scale-feature image. In another embodiment the step of filtering the large-scale-feature image includes low-pass filtering the satellite visible meterological image. In another embodiment the step of filtering the small-scale-feature image includes high-pass filtering the satellite visible meteorological image. In another embodiment, generating a forecast includes the additional step of filtering the satellite visible meteorological image to generate a peakiness image indicative of cumulus clouds. In yet another embodiment, generating a forecast includes the additional step of generating a forecast image identifying the likelihood of convective meteorological events at a third time by combining the growth image and a current precipitation image and advecting the combined image to the third time.

In yet another aspect, the invention relates to a system for predicting near-term development of convective meteorological events and includes means for advecting a first meteorological image and combining the advected first meteorological image and a second meteorological image to generate a difference image, the first and second meteorological images indicative of a first forecast parameter at a first time and a second time, respectively, filter means for generating an interest image including a region of interest by filtering a third meteorological image, and means for combining the difference image and the interest image to generate a growth image indicative of the occurrence of a convective meteorological event.

In one embodiment the filter means includes a large-scale feature detector means for filtering the third meteorological image to generate a large-scale-feature image and a small-scale feature detector means for filtering the third meteorological image to generate a small-scale-feature image. In another embodiment the large-scale feature detector includes low-pass filter means for generating a low-pass filtered rendition of the third meteorological image and the small-scale feature detector comprises high-pass filter means for generating a high-pass filtered rendition of the third meteorological image. In another embodiment, the filter means further comprises a peakiness feature-detector means for generating a peakiness image indicative of cumuliform features.

BRIEF DESCRIPTION OF THE DRAWINGS

The invention is pointed out with particularity in the appended claims. The advantages of the invention may be better understood by referring to the following description taken in conjunction with the accompanying drawings in which:

DETAILED DESCRIPTION OF THE INVENTION

Short-Term Convective Weather Predictor System Overview

Figure 1:
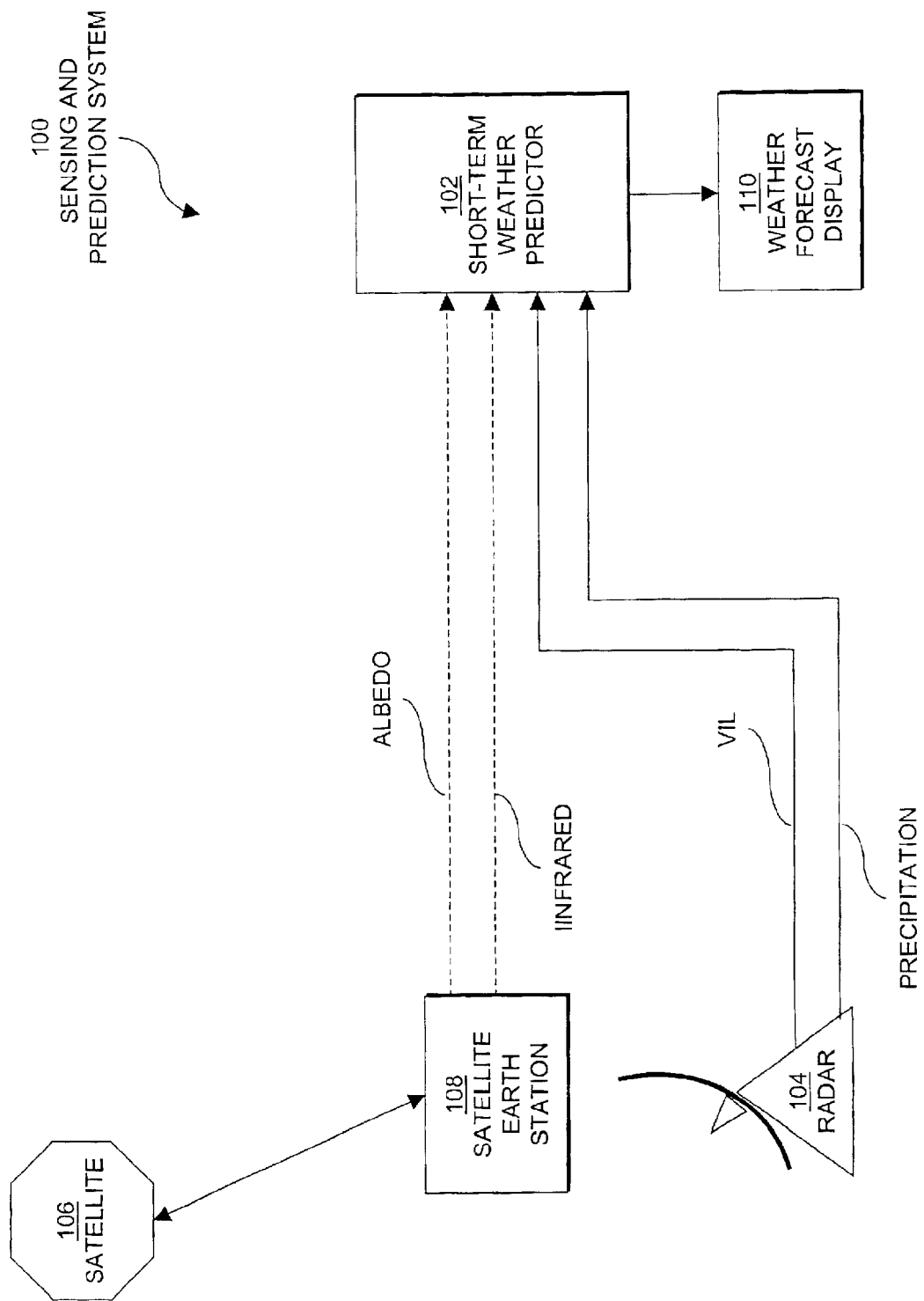
FIG. 1 is a block diagram depicting a sensing and processing system comprising a short-term convective weather predictor according to the invention.

FIG. 1 depicts a system block diagram of a weather sensing and prediction system 100 including one embodiment of the invention for predicting the initiation, growth and decay of convective weather, such as cumulus cloud formations and thunderstorms. The system 100 includes a short-term storm predictor 102 receiving meteorological data from one or more external sources and a weather forecast display 110. The weather forecast display 110 provides an image to an observer or image data appropriate for processing by additional processes or components (not shown). The external sources can include weather sensing systems, such as ground-based weather sensors 104 (for example, weather radars, airborne weather sensors, and space-based sensors). Alternatively, the external sources can include other computer systems, such as computers forwarding weather image files from the external systems and computers that provide simulated weather image data. For system configurations in which the external sources include satellites 106, the satellite data is generally first received by a satellite earth station 108, which performs some preprocessing on the received satellite data and transmits the pre-processed satellite data to the short-term weather predictor 102. The received meteorological data is indicative of one or more weather parameters, such as precipitation rate, vertically-integrated-liquid water content (VIL), temperature (e.g., infrared temperature), albedo, lightning occurrences, moisture, and wind-speed. The meteorological data can also include numerical model data or computer generated data indicative of any of the above-mentioned weather parameters. The meteorological data can be transmitted from the external source 104, 106 in any number of formats, and can be transformed at the source 104, 106, or at an intermediate processing element (e.g., the satellite earth station 108) into other formats, such as a meteorological image. In some embodiments, the meteorological image includes a multi-dimensional array, such as a two-dimensional array, of image elements. Generally, the meteorological image elements include pixel values which are quantitative measures of weather forecast parameters. For example, each pixel value can be associated with a number, such as any binary number, representative of a value of a weather parameter (e.g., precipitation rate). Each pixel is generally associated with a predetermined geographical location, or geographical area, such that the forecast parameter represented by each pixel is indicative of one or more aspects of the weather at the associated geographical location, or is indicative of an average of spatially-varying weather for the associated geographical area.

The radar 104 can include a system such as the ASR-9, Terminal Doppler Weather Radar (TDWR) or the Next Generation Weather Radar (NEXRAD). The satellite 106 can include a satellite system such as the Geostationary Operational Environmental Satellite (GOES) or the Polar Operational Environmental Satellite (POES). The radar 104 and satellite 106 can transmit more than one form of weather-related data. For example, the radar 104 can transmit a first channel of data relating to precipitation and a second channel of data relating to VIL. Similarly, the satellite 106 can transmit a first channel of data relating to infrared radiation and a second channel of data relating to albedo. Other entities provide similar weather information (commonly referred to as a "ground feed") that may include remapped, or composite representations of weather information from one or more sources 104, 106. The short-term storm predictor 102 processes received data from one or more sources 104, 106 and/or ground feed and predicts the initiation, development and decay of convective weather by identifying areas of growth and decay.

In one embodiment the short-term storm predictor 102 determines a short-term forecast in response to receiving radar data. In another embodiment, the short-term storm predictor 102 determines a short-term forecast in response to receiving satellite data. In another embodiment, the short-term storm predictor 102 determines a short-term forecast in response to receiving radar data and satellite data. In yet another embodiment, the short-term storm predictor 102 determines a short-term forecast in response to receiving numerical model data.

Figure 2:
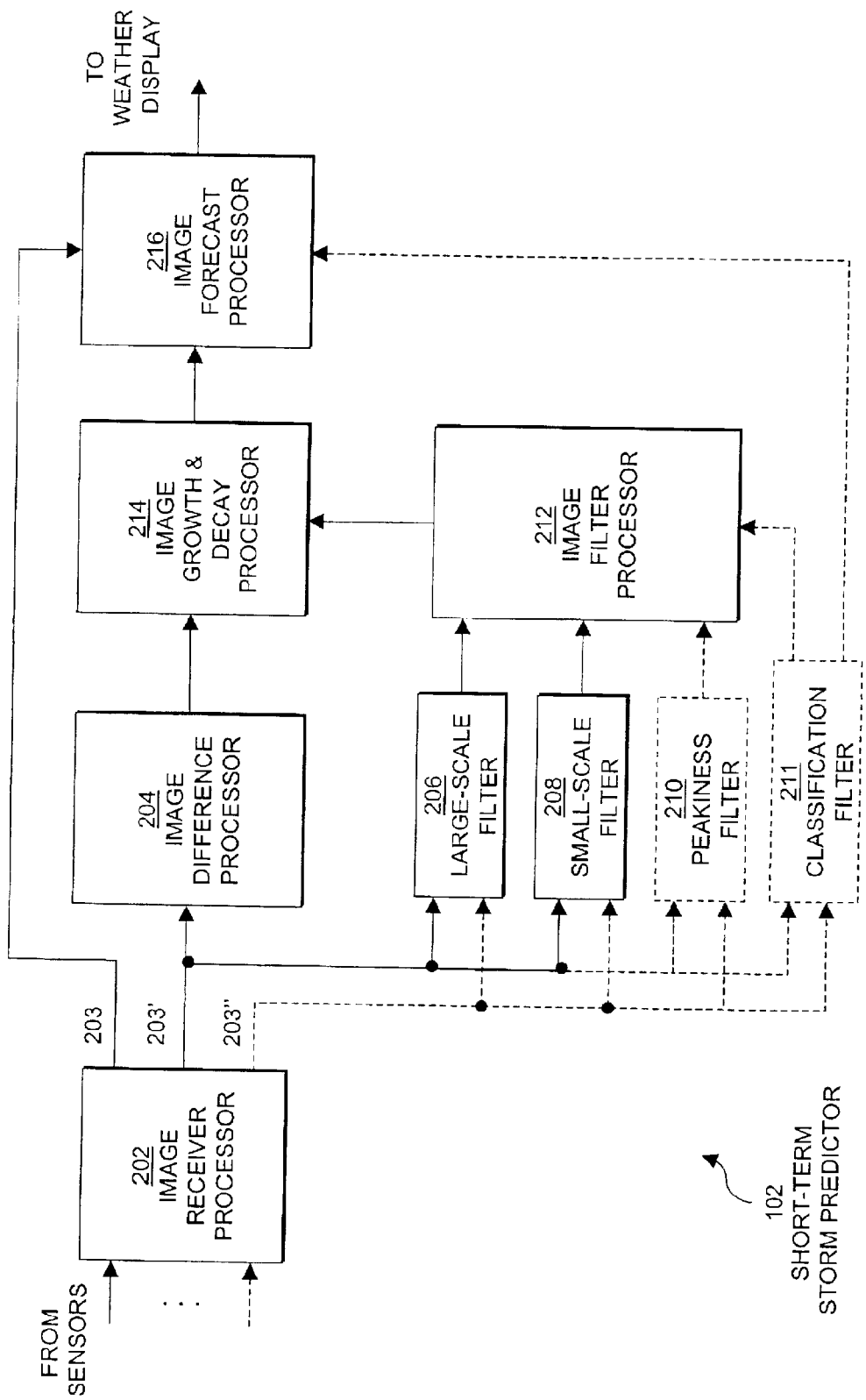
FIG. 2 is a block diagram depicting an embodiment of a short-term weather predictor.

In one embodiment, illustrated in FIG. 2, the short-term storm predictor 102 includes an image receiver processor 202 receiving meteorological images from one or more external sources 104, 106. The image receiver processor 202 includes output ports 203, 203', 203", each transmitting at least one or more processed meteorological image. An image difference processor 204 communicates with at least one of the image receiver processor output ports 203, 203', 203" and receives a first and a second processed meteorological image. The image difference processor 204 generates a difference image representing the difference of the first and second processed meteorological images and transmits the difference image to an image growth-and-decay processor 214. A number of image filters, including a large-scale image filter 206, a small-scale image filter 208, and optionally a "peakiness" filter 210 and/or a classification filter 211 communicate with at least one of the image receiver processor output ports 203, 203', 203". Each of the image filters 206, 208, 210, 211 receives a processed meteorological image, such as one of the first and the second meteorological image, or alternatively, a third meteorological image. Each of the filters 206, 208, 210, 211 individually filters the received processed meteorological image to produce a respective filtered image, that is provided to an image filter processor 212. The image filter processor 212 generates a composite filtered image, or interest image, based on the received filtered images and transmits the interest image to the image growth-and-decay processor 214. The interest image identifies various regions of the meteorological image likely to contain convective weather.

The image growth-and-decay processor 214 generates a growth-and-decay image in response to the difference image and the interest image. In the illustrated embodiment, the image forecast processor 216 communicates with the image growth-and-decay processor 214, the image receiver processor 202 and, optionally, the classification filter 211. The image forecast processor 216 receives a processed meteorological image from the image receiver processor 202, the growth-and-decay image from the growth-and-decay processor 214 and, optionally, classification data from the classification filter 211. The processed meteorological image can be a precipitation image including data forecast parameters indicative of precipitation rates for an array of geographical locations. In general, the processed image can include any parameter indicative of convective weather, such as any of the above mentioned weather parameters. The image forecast processor 216 generates a short-term convective weather image for transmission to a weather display unit or other weather processor modules. The short-term convective weather forecast image indicates the locations and likelihood of initiation, growth and/or decay of convective weather for a forecast time period that can be up to 120 minutes or more.

In one embodiment, the short-term storm predictor 102, as represented by the filters 206, 208, 210, 211 and processors 202, 204, 212, 216, is implemented in software. The implementing software can be a single integrated program or module. Alternatively, the implementing software can include separate programs or modules for one or more of the filters 206, 208, 210, 211 and processors 202, 204, 212, 214, 216. In other embodiments, the short-term storm predictor 102 is implemented in hardware, such as electronic filters, or circuitry implementing digital signal processing. In yet other embodiments, the short-term storm predictor 102 is implemented as a combination of software and hardware.

Generally, the image receiver processor 202 receives from one or more external sources 104, 106 meteorological image files representing one or more weather parameters over a known geographical region. In some embodiments, the received data is in the form of binary files. For example, the binary files can be formatted according to standard graphical formats, such as JPEG, GIF, TIFF, bitmap, or, alternatively, the binary files can be formatted in a custom format. Typically, the image receiver processor 202 receives updated meteorological images from each external source 104, 106 forming a sequence of images representative of weather parameters at different times. Generally, the individual images represent weather parameter values over substantially the same geographical region, but differing from the previous image by a uniform time interval, e.g., several minutes or more. The image receiver processor 202 optionally reformats each received meteorological image from a native format (e.g., bitmap) to a common format suitable for further processing (e.g., TIFF). Alternatively, the image receiver processor 202 interpolates and/or extrapolates, as required, the received meteorological image files received from one or more of the remote sources 104, 106, for example, to align the pixel values to a common geographical location, or area. Interpolated or extrapolated alignment can be necessary for system configurations in which meteorological images are received from different remote sources 104, 106. The image receiver processor 202 can include memory for temporarily storing one or more of the received meteorological and/or processed images, or portions of the same.

The image difference processor 204 stores at least one of the processed meteorological images, such as the first processed meteorological image indicative of a weather parameter at a first time, as subsequent processed meteorological images are received from the image receiver processor 202. In one embodiment, the image difference processor 204 calculates a difference image by subtracting a transformed version of the stored first processed meteorological image from a later (e.g., current) meteorological image. In another embodiment, the image difference processor 204 calculates multiple preliminary difference images. The preliminary difference images are averaged to obtain the difference image. The difference image is generally representative of a time-rate-of-change in the processed meteorological image (e.g., a time derivative), which representative of the time-rate-of-change in the corresponding weather parameter. In one embodiment, the image difference processor 204 determines the difference image by subtracting the previous, stored processed meteorological image from the current processed meteorological image. As the weather features (e.g., cloud formations) generally moves according to local winds, transformation (e.g., advection) of the first processed meteorological image is performed prior to determining the difference image. Execution of the transformation step prior to computing the difference image reduces and/or eliminates simple movement, or translation, of weather features from introducing a false indication of growth or decay. Advection, generally refers to the process of translating portions, or sub-regions of the processing image, such as individual pixels, or groups of pixels, according to a transform quantity, such as a vector field indicative of the prevailing winds at different locations. The image difference processor 204, having advected the previous processing image then, subtracts the advected processing image from the current processing image. In some embodiments, the image difference processor 204 repeats the difference process as each new image is received in the time series of processing image. The subtraction process operates to identify and quantify areas of growth and/or decay of the weather parameter represented by the pixel values.

Similarly, the filters 206, 208, 210, 211 receive a time series of processed meteorological images. In one embodiment, the filters 206, 208, 210, 211 receive the same time series of processed meteorological images as received by the image difference processor 204. In one embodiment the image difference processor and the filters 206, 208, 210, 211 each receive processed meteorological images relating to satellite infrared images. In another embodiment, the image difference processor 204 receives a first meteorological image originating from a first external source, such as the satellite 106 as described above, and the filters 206, 208, 210, 211 receive a second meteorological image originating from a second, or alternative source, such as the radar 104. The first and second meteorological images represent weather within the same general geographic region. Each of the filters 206, 208, 210, 211 receives the processed meteorological image and generates a filtered image. The filtering process can include various filtering methods, such as standard image filtering techniques or functional template correlations, or electrical (e.g., video) filtering of the spectral components, temporal components, or amplitude components of the received image.

Generally, the large-scale filter 206 enhances large-scale features of the processed meteorological image. For example, large scale features can be indicative of weather fronts or organized storms. The large-scale image features can be enhanced, for example, by attenuating small-scale features. In one embodiment, the large-scale filter 206 is a low-pass spatial filter, passing image features having low spatial frequency components and attenuating, or eliminating, image features having high-spatial-frequency components.

The small-scale filter 208 enhances small-scale features, or details, of the received image. Small scale features can be indicative, for example, of single storm cells, or cumulus formations of limited geographic extent. In a manner complementary to that employed by the large-scale filter 206, the small-scale features can be enhanced, for example, by attenuating large-scale features. In one embodiment, the small-scale filter 208 is a high-pass spatial filter for passing image features having high-spatial-frequency components and attenuating, or eliminating, low-spatial-frequency image features.

The peakiness filter 210 enhances image features indicative of local maxima within a sub image. The peakiness image reflects structural details of the received weather image indicating regions likely to contain cumulus formations. In one embodiment, the peakiness filter 210 receives a weather image representing albedo. The peakiness filter 210 generates a peakiness image by subtracting an average image from the received weather image. The large-scale features, or biases, are thus removed leaving the peakiness image. The peakiness filter 210 can generate the average image locally, or can use the already-generated average image from the large-scale filter 206.

The classification filter 211 identifies weather patterns, or details, of the received image. For example, image features referred to as small or large cell can be indicative of single storm cells, or cumulus formations of limited geographic extent. Image features can be further differentiated into line image features and stratiform image features. Line features can be indicative of organized storms, such as those occurring along a weather front and stratiform features can be indicative of large areas of cloud cover, not necessarily associated with convective weather.

The image filter processor 212 generates a composite, filtered image based on filtered images provided by the filters 206, 208, 210, 211. Generally, the composite, filter image emphasizes geographical areas indicative of the initiation, growth and/or decay of convective weather. Likewise, the composite, filter image de-emphasizes geographic areas not associated with the initiation, growth and/or decay of convective weather. The de-emphasis process includes identifying areas that can include convective weather within an organized storm that does not exhibit growth or decay. In one embodiment the composite, filtered image includes an array of numeric, or scaling values. For example, pixel values in emphasized areas can include increased and pixel values not included in the emphasis areas can be decreased. Alternatively, the composite, filtered image can include values of unity for areas of emphasis and values of zero for areas of de-emphasis, effectively forming a mask image, or convective-weather template.

The image growth-and-decay processor 214 generates a growth-and-decay image based on the difference image and the composite-filtered, or interest image. Generally, the growth-and-decay image is indicative of sub-regions likely to experience growth and decay within a forecast time. As the difference image identifies all areas where the monitored weather parameter experienced a growth and decay, it can over predict the initiation, growth and/or decay of convective weather. Thus, the image growth-and-decay processor 214 applies the emphasis and de-emphasis of the interest image to the difference image to more accurately identify the initiation, growth and/or decay of convective weather.

The image forecast processor 216 generates a short-term forecast image the processed meteorological image, the growth-and-decay image, and, optionally, the feature classification image. In one embodiment, the image forecast processor 216 identifies areas within the processed meteorological image likely to experience initiation, growth and/or decay in response to the growth-and-decay image. The identified areas of growth and/or decay can then be predicted using weather models to identify a future weather parameter value within the meteorological image. This process is repeated for each region of the image and the resulting image is transformed through advection to a representative forecast image at the desired forecast time. For example, the local image feature speed and direction can be applied to pixels or sub-regions of the processed meteorological image to translate (i.e., vector) its pixels or subregions through a distance, proportional to the forecast time, in the corresponding direction.

Method Overview

Figure 3:
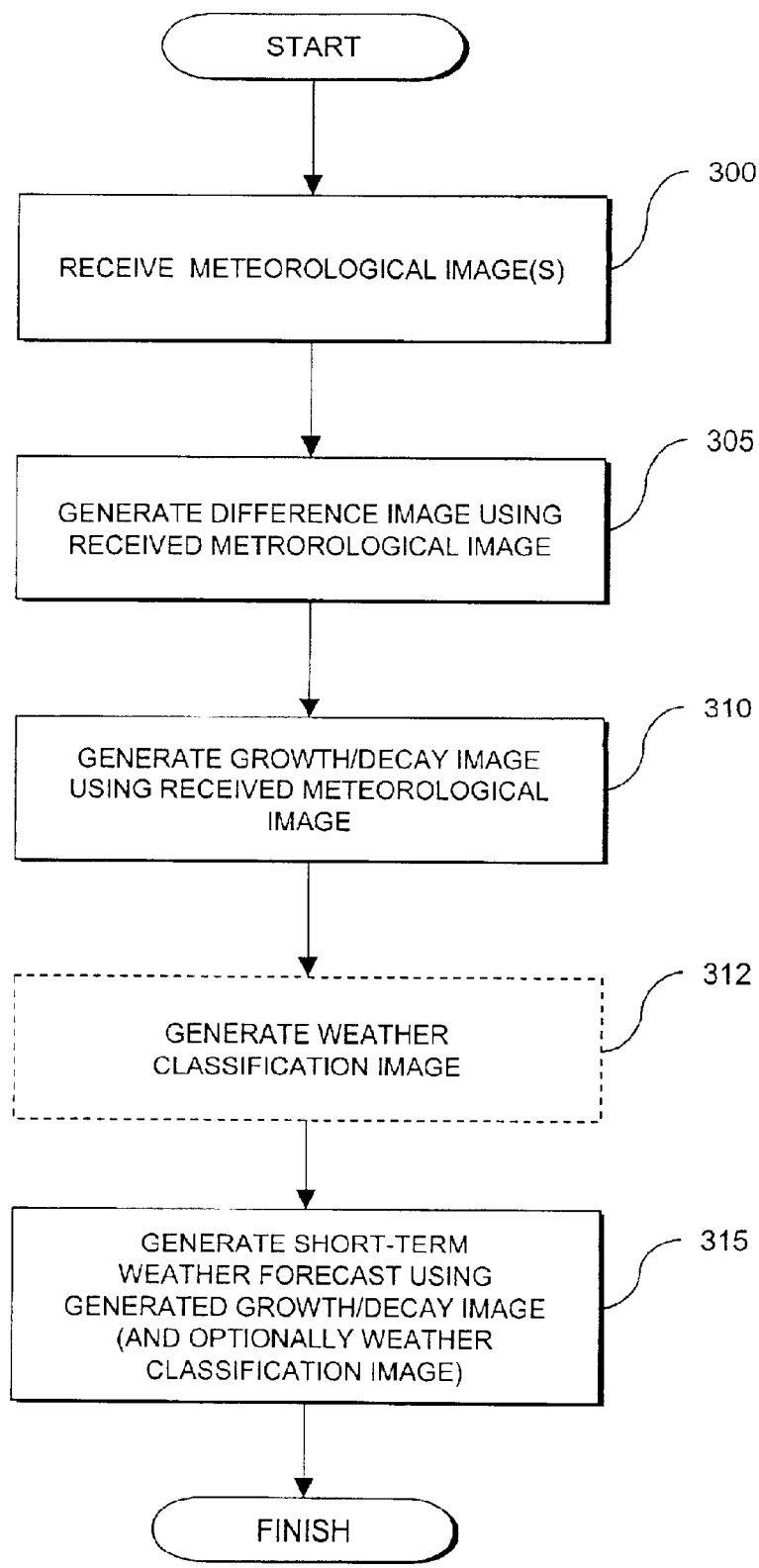
FIG. 3 is a flow diagram generally illustrating an embodiment of a process for generating short-term convective weather forecasts.

One embodiment of a process implemented by the short-term storm predictor 102 is illustrated by the flowchart of FIG. 3. The process operates upon meteorological images received from one or more external sources 104, 106 (Step 300). Generally, the images identify weather forecast parameters indicative of convective weather. The meteorological images are typically comprised of pixels, each pixel including a color and/or intensity indicative of the value, or range, of the corresponding forecast parameter. For example, a meteorological image indicative of infrared temperature can be comprised of a two-dimensional array of pixels. Each image pixel is assigned a color value from a predetermined range of colors. Each color represents a predetermined infrared temperature, or sub-range of infrared temperatures. The lowest and highest color values would, for example, correspond to the lowest and highest anticipated infrared temperatures, respectively.

The image difference processor 204 generates a difference image using a first and second received meteorological image (Step 305). The difference image is indicative of a time rate of change in the weather parameter of the received meteorological image. For example, where the meteorological image represents infrared temperature (e.g., cloud temperatures), the difference image generated from the infrared image indicates an increase or decrease in infrared temperature (e.g., a rise or drop in infrared temperature between the two images). Generally, the difference image is similar in form to the first and second meteorological images (e.g., an array of pixels), but the pixel-value scale of the difference image can be different.

A growth/decay image is generated from the received difference image and a received interest image (Step 310) identifies areas of the received meteorological images that are likely to be experiencing a growth, or situation in which the portrayed weather parameter is indicative of the growth or initiation of convective weather. In a broad sense, the term "growth" can at the same time include both positive growth (e.g., cumulus cloud formations increasing in altitude) and negative growth, or decay (e.g., the dissipation of storm cells or cloud formations). Both positive and negative growth are important indicators of forecasted weather. A frontal storm can exhibit growth along its leading edge as new storm cells form and at the same time exhibit decay along its trailing edge old storm cells dissipate.

In an optional step, features in the meteorological image are classified into one of a number of predefined categories (Step 312). Examples of weather classifications include lines, stratiform regions, large cells, and small cells. Through image-processing techniques, the classification filter 211 identifies regions in the meteorological image according to the predefined weather categories.

A short-term weather forecast is generated using the current meteorological image, the difference image, the generated growth/decay image and, optionally, the weather classification image (Step 315). The forecast image generally indicates regions likely to experience, at the forecast time, weather within a predetermined range of severity. In one embodiment, the image forecast processor 216 transmits an indication of severe weather within a predetermined geographical region. The transmitted indication can result in an operator alert of the forecasted weather, such as an audible or visual alarm. For example, when the forecast indicates that, within a sector of airspace being controlled by an air traffic controller, there is a substantial likelihood of severe weather occurring at the forecast time, an alarm can be activated to alert the operator as to the situation.

Figure 4:
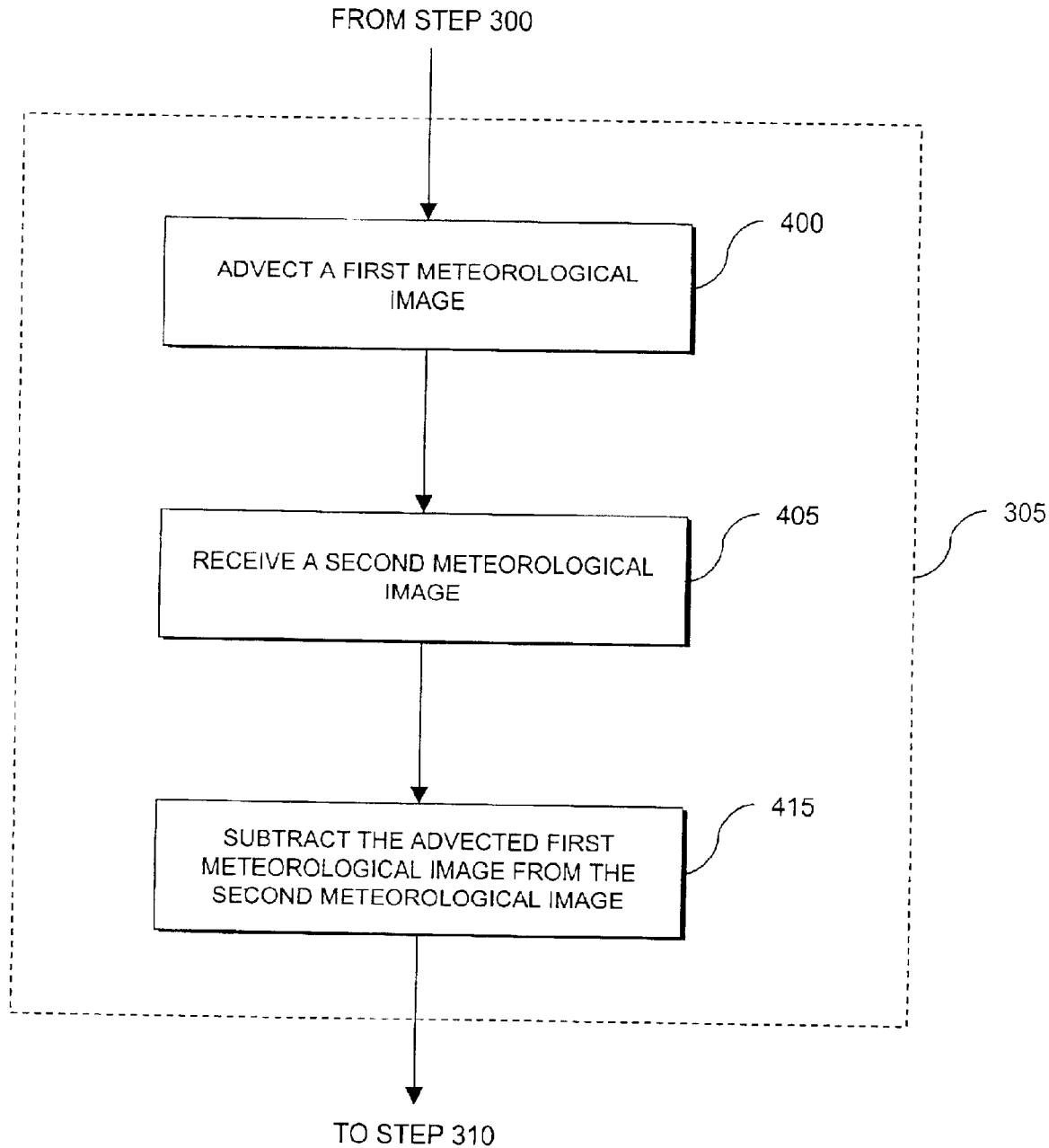
FIG. 4 is a flow diagram illustrating in more detail the step of generating a difference image for the process shown in FIG. 3.

In more detail, referring now to FIG. 4, the difference image can be generated by advecting a first received meteorological image and subtracting the advected image from a second meteorological image (Step 400). The first and second meteorological images are representative of a weather parameter at a first time and a second time, respectively, for a common geographical regions. For example, the first meteorological image can be representative of VIL for a predetermined geographical region at a first (reference) time; whereas, the second meteorological image can be representative of VIL for the same geographical region at a second (later) time.

In one embodiment, the step of advecting the first image includes translating sub-regions of the first image according to an advection field. The first image is advected to represent an estimate of the first meteorological image at a second time. The advection field includes an array of vector elements overlaying the geographical area of the first image. Each vector element of the advection field is indicative of a velocity (direction and speed) of the forecasted parameter at the location of the vector element. Generation of the advected image can then be accomplished by translating sub-regions of the first meteorological image from their sensed locations at the first time to estimated locations at the second time according to the advection field vector elements. The direction of each sub-region translation is determined from the direction represented by the advection vector element associated with the sub-region. The distance of the translation of each sub-region is determined from the magnitude (i.e., speed) represented by the advection vector element by first multiplying the speed by the time difference measured by subtracting the second time from the first time.

In one embodiment, the advection field is generated by tracking the movement of identifiable features over successive meteorological images. In one embodiment, the advection field is updated with the reception of each new updated meteorological image.

A second meteorological image is received at a second time (step 405). A difference image is generated by subtracting the advected image, representative of the first meteorological image at the second time, from the received second image (step 415). For instances in which there is little or no change in the weather parameter, the resulting difference image exhibits little or no change. For example, when a region of the advected first image is substantially equivalent to the corresponding region of the second meteorological image, the pixel values for those regions in the difference image are approximately zero. Conversely, when new storm cells are initiated, or the extent of already-identified storm cells increases or decreases, the difference image yields pixel values corresponding to the magnitude of the change.

Figure 5:
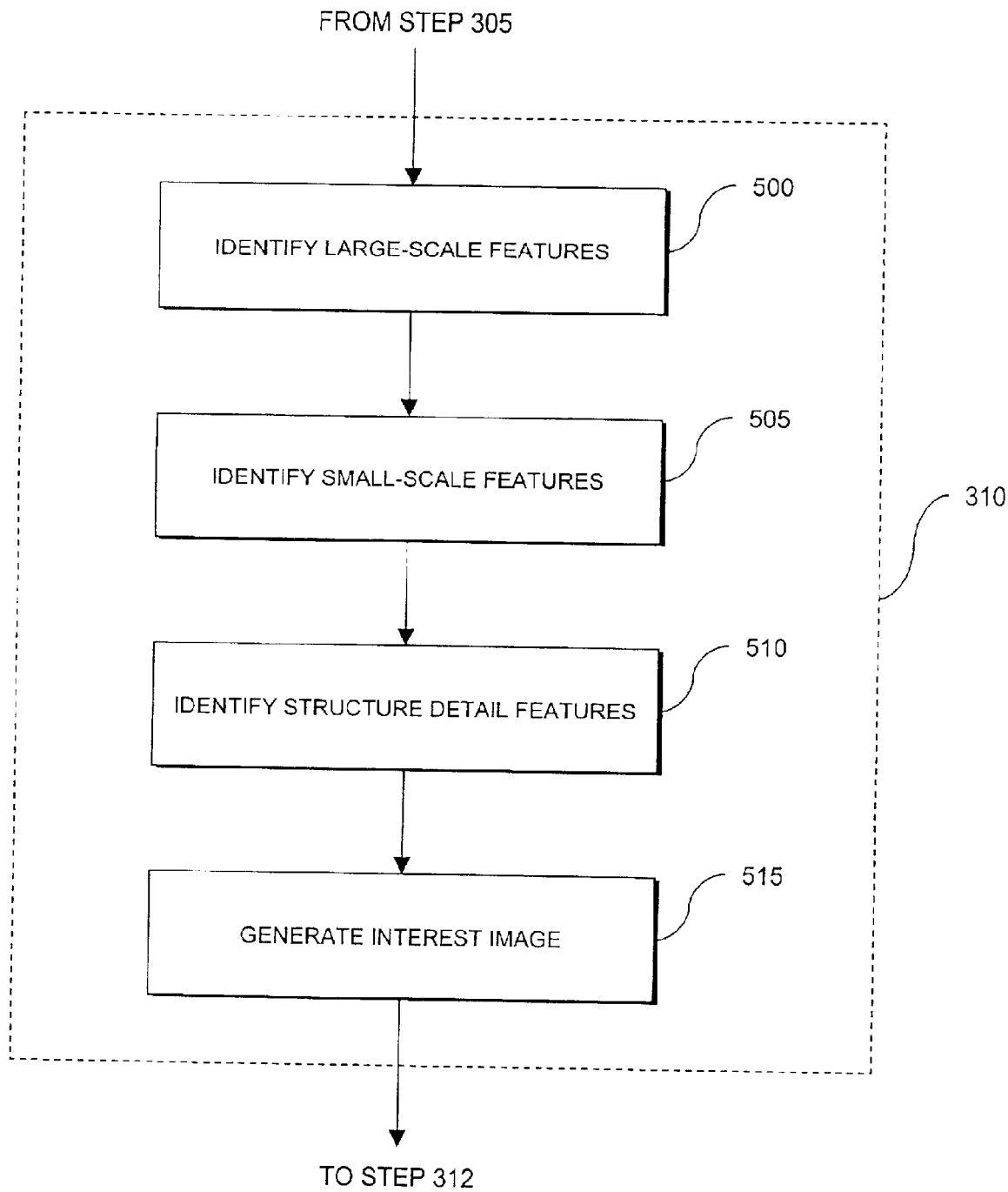
FIG. 5 is a flow diagram illustrating in more detail the step of generating an interest image for the process shown in FIG. 3.

In more detail, referring now to FIG. 5, the interest image is generated by first identifying large-scale image features such as those associated with a line, or frontal storm. The large-scale image features can be identified using standard image-processing techniques, such as low-pass spatial filtering of the received image. For example, a low-pass filter can be implemented by calculating an average at each pixel of values of the surrounding pixels within a predetermined area and replacing the value of the pixel with the value of the calculated average. The process is repeated at each pixel in the image. The predetermined area can be identified by a "kernel" identifying the of surrounding pixels that will be averaged. The kernel can be any shape, such as a rectangle, an ellipse, a square, and a circle. Generally, some care is required to select the size of the kernel, such that the low-pass filter distinguishes image features considered large (e.g., larger than a storm cell). In some embodiments, a scoring function is also applied in combination with the kernel. For example, an average value can be determined through application of the image kernel to average surrounding pixels within the kernel. The scoring function generates an output value for the processed image based on the average value. The scoring function can be used to de-emphasize low average-value pixels and/or emphasize high average-value pixels. Generally, scoring functions are predetermined one-to-one mappings of output pixel values for a range of input pixel values. Scoring functions can be initially estimated and later refined based on empirical results to improve the overall forecast accuracy. The scoring functions can be defined for any of the processed image features.

Determination of the interest image is also based on identifying small-scale image features (Step 505). The small-scale image features are identified using standard image-processing techniques, such as high-pass spatial filtering of the received image. For example, a high-pass filter can be implemented by calculating for each pixel a standard deviation based on the pixel values of predetermined surrounding pixels and replacing the value of the subject pixel with the calculated standard deviation value. The predetermined surrounding pixels can be identified using a kernel having a shape that can be the same as the low-pass filter kernel. Alternatively, a kernel having a different shape can also be used as the low-pass filter. Care is also required to select the size of the kernel, such that the high-pass filter distinguishes image features considered small (e.g., on the order of a storm cell). As described above, a scoring function can be applied to emphasize small-scale features and/or de-emphasize large-scale features.

The interest image can also be further refined by identifying other image details, such as edges, or structure (Step 510). In one embodiment, peakiness indicative of image features having fine detail, such as those associated with cumulus formations are calculated. The peakiness image features are identified through standard image-processing techniques, such as convolution filtering of the received image. For example, a convolution filter can be implemented by calculating an autocorrelation at each pixel of values of the surrounding pixels within a predetermined area and replacing the value of the pixel with the value of the calculated autocorrelation. Care is also required to select the size of the kernel, such that the peakiness filter distinguishes image feature detail consistent with cumulus formation structure.

The interest image can optionally be based on classifying image details into one of a number of predetermined weather categories. Some examples of weather categories include lines, stratiform regions, large cells, and small cells. The image features can be classified through standard image-processing techniques, such as pattern recognition. For example, a number of different kernels can be used to process the image in which each kernel is indicative of at least one of the storm classifications being determined.

The interest image is generated from the received filtered images from implementation of the various spatial filters (Step 515). The interest image identifies areas of the received meteorological image that are likely to contain features indicative of a convective weather event.

Method of Generating the Short-Term Forecast

Figure 6:
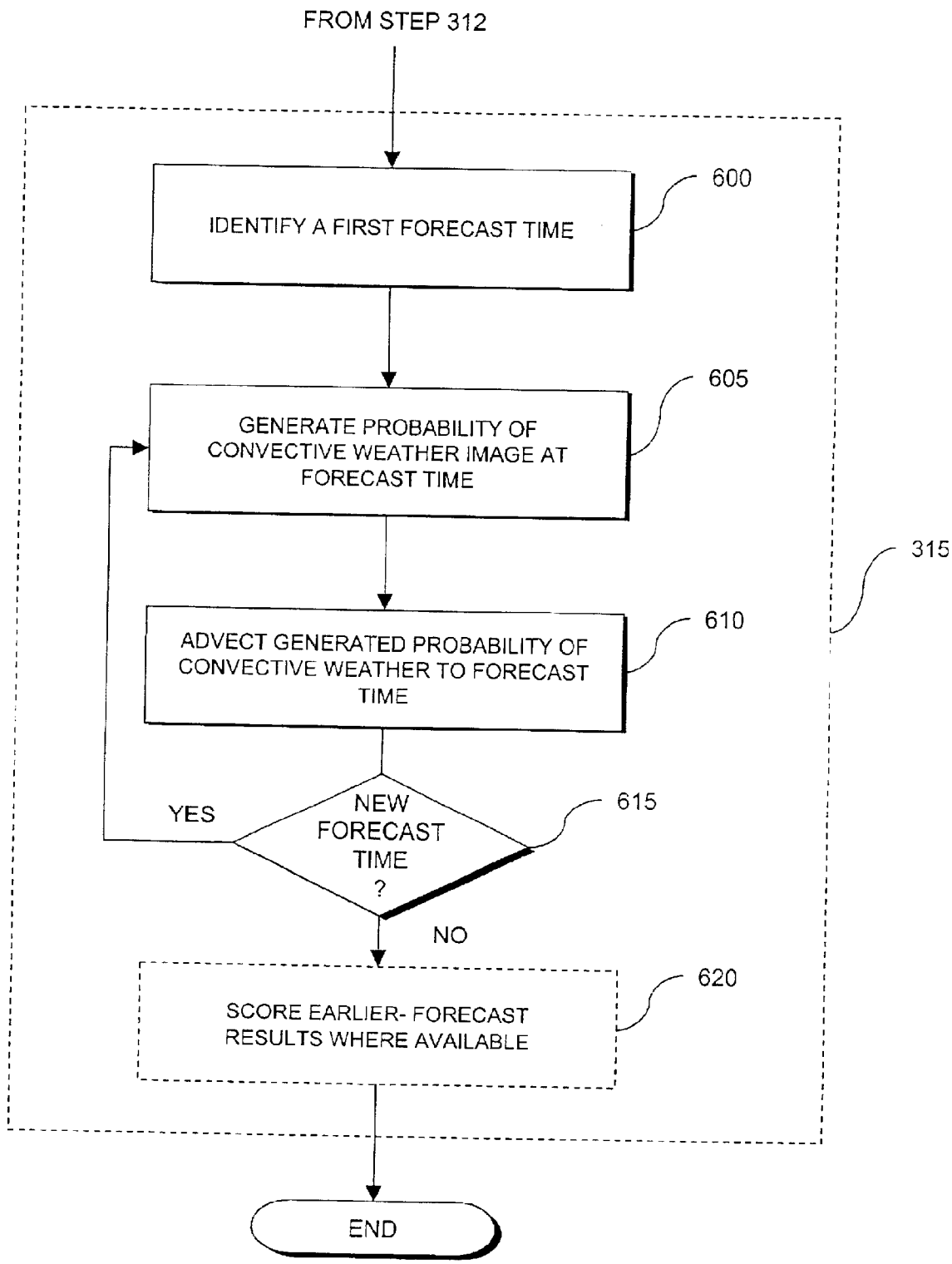
FIG. 6 is a flow diagram illustrating in more detail the step of generating a short-term weather forecast for the process shown in FIG. 3.

In more detail, referring now to FIG. 6, short-term convective weather forecast are generated by first identifying a first forecast time (Step 600). Generally, the forecast time is selected as a time ranging from a several minutes to several hours. The forecast time, is generally measured from the time of the latest received meteorological image.

A probability of convective weather of a predetermined category, or range of categories is generated at a first forecast time (Step 605). The generated probability of convective weather image is then advected according to an advection field, to the first forecast time (step 610) representing the forecast of convective weather. Image filtering can be applied to the advected forecast image to smooth edges and fill in any discontinuities in the image (e.g., speckling, or holes). This last stage of image filtering is not driven by the forecast, but rather the physical realities of the weather. The weather is not prone to abrupt changes in location, but rather exhibits some degree of smoothing. In some embodiments, convective weather forecasts are generated at multiple "look ahead" times. For example, forecasts at 30 minutes, 60 minutes, 90 minutes, and 120 minutes can be generated from the same received weather images. To accomplish this, a new forecast time is identified (step 615) and the process repeats from step 605. The results of previous forecasts derived from previously received weather images can be stored and compared to the received weather images to determine the accuracy of the forecasts (i.e., scoring) (step 620).

In one example and with reference again to FIGS. 1 and 2, the short-term predictor 102 generates a short-term storm forecast responsive to receiving satellite meteorological images. First, the image receive processor 202 receives a visible satellite image representative of albedo. The image is pre-processed by the receive processor 202, for example, to remove pixels for which the albedo value is below a predetermined threshold, such as 0.18, indicating a lack of significant cloud formations. This preprocessing can simplify subsequent processing by removing or ignoring pixels that are not indicative of convective weather. The large-scale filter 206 receives the preprocessed image and generates a visible large scale image by performing a spatial, or neighborhood averaging of the received image. In one embodiment, the large-scale filter uses a 15 pixel-by-15 pixel kernel. The large-scale filter 206 centers the kernel on a pixel of the received (or reprocessed) meteorological image and averages all pixels of the received image within the boundaries of the kernel. The resulting averaged value replaces the pixel value in the received image. The kernel is subsequently moved to another pixel in the image, and this process is repeated until averages have been computed for substantially all pixels.

Similarly, the small-scale filter 208 receives the preprocessed image and generates a small-scale image by performing a spatial standard deviation of the received image pixels. A 15 pixel-by-15 pixel kernel is used to determine the set of pixels for calculation of the standard deviation. The peakiness filter 210 receives the preprocessed image and generates a peakiness image by filtering the image to accentuate cloud peaks of the received image. In one embodiment, the peakiness image is computed by subtracting the large-scale image from the visible image.

The image filter processor 212 receives the large-scale image, the small scale image and the peakiness image and generates an interest image. The interest image is generated by assigning an interest value to pixels or regions of the processed images for which the standard deviation is high and the large-scale filtered value is low. This typically includes cumulus existing in a region outside of an organized storm region. The resulting interest image is further processed to fill in holes, or gaps, and generally, to smooth the appearance of the image. The image filter processor 212 filters the image using an image processing concepts of "dilate" and "erode." In one embodiment, a kernel, such as a 5 pixel-by-5 pixel kernel is applied to each pixel of the interest image. A dilate image is computed by replacing the value of a pixel with the maximum pixel value of a group of pixels identified by the kernel. The replacement process can be one or more times. Similarly, a kernel is applied to each pixel of the interest image and an erode is generated by replacing the value of the center pixel with the minimum value of the group of pixels identified by the kernel. The erode process can be repeated a second time. The image filter processor 212 then transmits the resulting interest image to the image growth-and-decay processor 214.

The growth-and-decay processor 214 also receives the difference image from the image difference processor 204 indicative of the growth and/or decay of cumulus elements. Cumulus elements exhibits a drop in temperature during the growth phase, as the cloud tops cool as they increase in altitude. The image growth-and-decay processor 214 then generates the growth/decay image by identifying weather severity levels based upon the received images. For all other image regions containing data, the weather level is set to level 2. A zero value is assigned to all other regions of the image.

In a second example of operation of the short-term weather predictor 102, the image receive processor 202 receives a radar data image representative of precipitation (e.g., VIL). The image difference processor 204 computes a precipitation difference image indicating areas of increasing and/or decreasing precipitation. The small-scale filter 208 generates a small-scale image by taking the spatial standard deviation of the received image. The image growth-and-decay processor removes pixels from the difference image if the precipitation is below a predetermined level, or masks regions of the difference image for which the difference values are below a predetermined value.

Figure 7B:
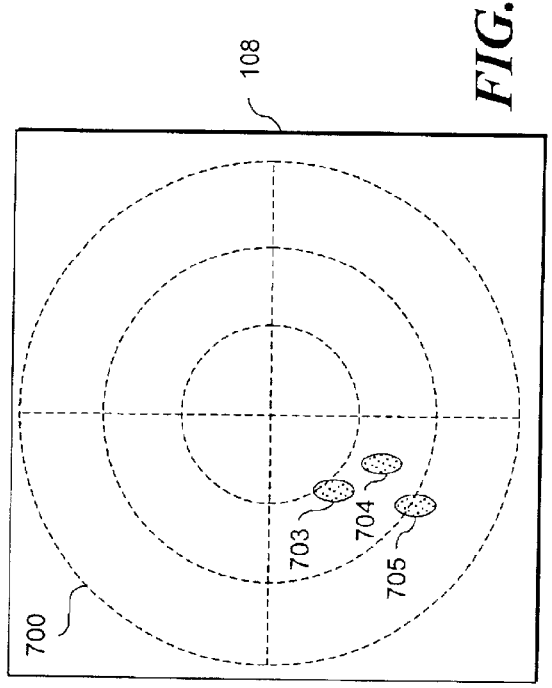
FIGS. 7A through 7D are exemplary schematic diagrams illustrating the processing of weather images to generate a short-term convective weather prediction according to the invention.
Figure 7A:
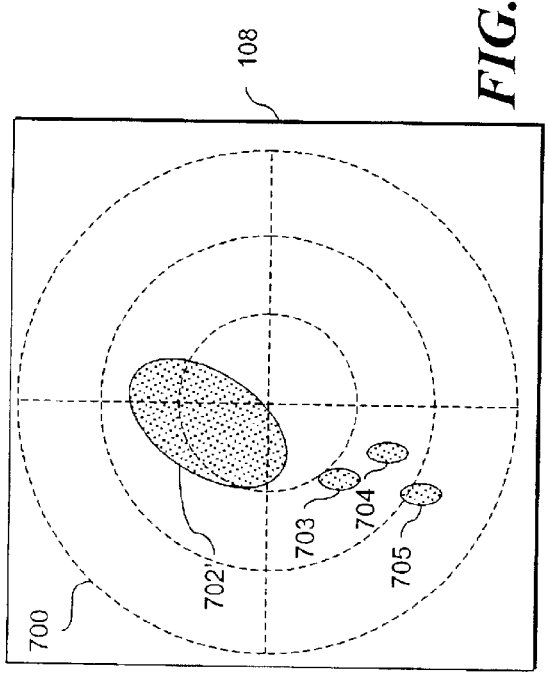
Figure 7D:
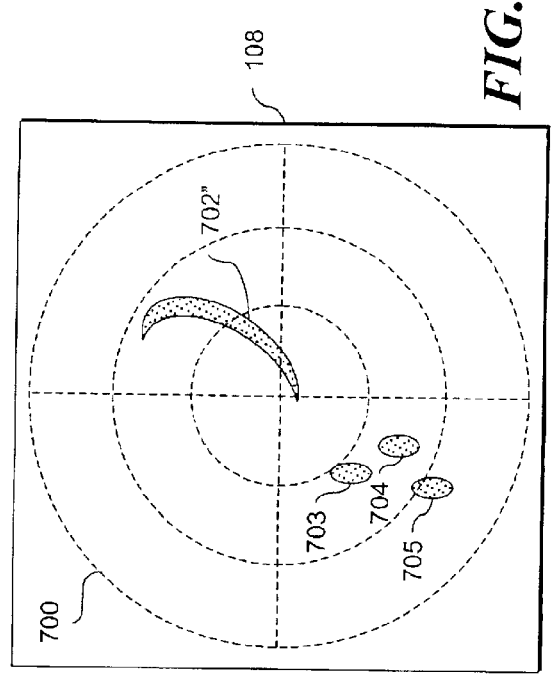

By way of example and with reference to FIGS. 7A through 7D, the processing of a simplified, exemplary meteorological image is described. FIG. 7A represents a simplified first meteorological image, such as a radar image including a first weather element 702 indicative of a forecast parameter, such as VIL. The first weather element 702 is shown optionally in relation to a graticule 700 (shown in phantom). The graticule 700 assists in identifying relative movement and location of the first weather element 702. FIG. 7B represents a simplified second meteorological image, such as a second radar image obtained from the same radar as the first image, but at a later time. The weather image includes a later representation of the first weather element 702'. A comparison of weather element 702' to weather element 702 indicates that the weather element 702 has moved to a new location and increased in size (e.g., northeastward in this example, with north being represented by the twelve o'clock position of the graticule 700). The second meteorological image also includes additional weather elements 703, 704, 705 appearing for the first time.

Figure 7C:
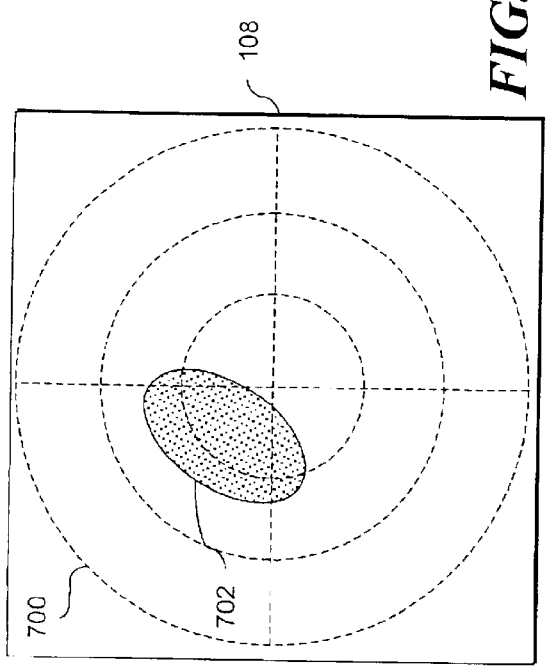

Referring now to FIG. 7C, a difference image is shown representing the results of subtracting the advected first meteorological image illustrated in FIG. 7A, from the second meteorological image illustrated in FIG. 7B. A first difference weather element 702" results from the increase in storm size. The new weather elements 703, 704, 705 appear substantially unchanged because they were not present in the first meteorological image. Applying the large-scale spatial filter to FIG. 7B will result in a large-scale image (not shown) that includes the first weather element 702', but not the new weather elements 703, 704, 705. Similarly, applying a small-scale, or standard-deviation, filter to FIG. 7B results in a small-scale image illustrated in FIG. 7D that includes the new weather elements 703, 704, 705.

Having shown the preferred embodiments, one skilled in the art will realize that many variations are possible within the scope and spirit of the claimed invention. It is therefor the intention to limit the invention only by the scope of the claims.

What is claimed is:

1. A method for a computer-assisted prediction of near-term development of convective meteorological events comprising the steps:

(a) determining a difference image by advecting a first meteorological image and combining the advected first meteorological image and a second meteorological image, the first and second meteorological images each comprising data indicative of a first forecast parameter at a first time and a second time, respectively;

(b) generating an interest image comprising a region of interest by filtering a third meteorological image; and (c) generating a growth image indicative of the occurrence of a convective meteorological event by combining the difference image and the interest image.

2. The method of claim 1 wherein the data of the first meteorological image comprise a two-dimensional array of pixels, each of the of pixels having a value quantifying the first forecast parameter for a predetermined geographical area.

3. The method of claim 1 wherein the first forecast parameter comprises at least one of precipitation, infrared temperature, radar reflectivity, vertically-integrated liquid (VIL), temperature stability, and albedo.

4. The method of claim 1 wherein the step of determining the difference image comprises subtracting the advected first meteorological image from the second meteorological image.

5. The method of claim 4 wherein the step of determining a difference image comprises the steps of:
   determining a plurality of preliminary difference images; and
   averaging the plurality of preliminary difference images to generate the difference image.

6. The method of claim 1 wherein the third meteorological image is the first meteorological image.

7. The method of claim 1 wherein the third meteorological image is indicative of a second forecast parameter.

8. The method of claim 1 wherein the step of generating the interest image comprises:
   (a) filtering the third meteorological image to generate a large-scale-feature image; and
   (b) filtering the third meteorological image to generate a small-scale-feature image.

9. The method of claim 7 wherein the step of filtering the large-scale-feature image comprises low-pass filtering the third meteorological image.

10. The method of claim 8 wherein the step of low-pass filtering comprises neighborhood-average filtering.

11. The method of claim 7 wherein the step of filtering the small-scale-feature image comprises high-pass filtering the third meteorological image.

12. The method of claim 10 wherein the step of high-pass filtering comprises neighborhood-standard-deviation filtering.

13. The method of claim 1 wherein the step of generating the interest image further comprises filtering the third meteorological image to generate a peakiness image indicative of convective weather.

14. The method of claim 12 wherein the step of generating the peakiness image comprises the steps:
   (a) averaging the third meteorological image to generate an average meteorological image; and
   (b) subtracting the average meteorological image from the third meteorological image.

15. The method of claim 1 further comprising the steps of:
   (a) combining the growth image and the first meteorological image to generate a forecast image identifying the likelihood of convective meteorological events at a third time; and
   (b) advecting the combined image to the third time.

16. The method of claim 1 further comprising the step of advecting the growth image with respect to time.

17. The method of claim 1 wherein the growth image comprises a decay image.

18. The method of claim 1 further comprising the step of classifying weather elements of the first meteorological image.

19. The method of claim 18 wherein the step of classifying weather elements comprises selecting weather classifications from at least one of line storm, stratiform, large cell and small cell.

20. A method for a computer-assisted prediction of near-term development of convective meteorological events comprising the steps:
   (a) determining a difference image by advecting a first precipitation image, and combining the advected first precipitation image and a second precipitation image, the first and second precipitation images indicative of precipitation at a first time and a second time, respectively;
   (b) generating an interest image comprising a region of interest by filtering the second precipitation image; and
   (c) generating a growth image indicative of the occurrence of a convective meteorological event by combining the difference image with the interest image.

21. The method of claim 20 wherein step (a) comprises the steps of:
   determining a plurality of preliminary difference images; and
   averaging the plurality of preliminary difference images to generate the difference image.

22. The method of claim 20 wherein the step of combining the advected first precipitation image and the second precipitation image comprises subtracting the manipulated first precipitation image from the second precipitation image.

23. The method of claim 20 wherein the precipitation image comprises data representative of vertically integrated liquid water content.

24. The method of claim 20 wherein the step of generating the interest image comprises:
   (a) filtering the first precipitation image to generate a large-scale-feature image; and
   (b) filtering the first precipitation image to generate a small-scale-feature image.

25. The method of claim 24 wherein the step of filtering the large-scale-feature image comprises low-pass filtering the first precipitation image.

26. The method of claim 24 wherein the step of filtering the small-scale-feature image comprises high-pass filtering the first precipitation image.

27. The method of claim 20 further comprising the steps of:
   (a) generating a forecast image identifying the likelihood of convective meteorological events at a third time by combining the growth image and a current precipitation image; and
   (b) advecting the combined image to the third time.

28. The method of claim 20 further comprising the steps:
   (a) advecting a growth image according to a first advection field;
   (b) advecting a current precipitation image according to a second advection field; and
   (c) combining the advected growth image and advected current precipitation image to generate a forecast image.

29. The method of claim 20 wherein the growth image comprises a decay image.

30. The method of claim 20 further comprising the step of classifying weather elements of the first meteorological image.

31. A method for a computer assisted prediction of near-term development of convective meteorological events comprising the steps:
   (a) determining a difference image by advecting a first infrared meteorological image and combining the advected first infrared image and a second infrared meteorological image, wherein the first and second infrared meteorological images are indicative of cloud temperature at a first time and a second time, respectively;
   (b) generating an interest image comprising a region of interest by filtering a satellite visible meteorological image; and (c) generating a growth image indicative of the occurrence of a convective meteorological event by combining the difference image and the interest image.

32. The method of claim 31 wherein step (a) further comprises the step of:

determining a plurality of preliminary difference images; and averaging the plurality of preliminary difference images to generate the difference image.

33. The method of claim 31 wherein the step of combining the advected first infrared meteorological image and the second infrared meteorological image comprises subtracting the manipulated first infrared meteorological image from the second infrared meteorological image.

34. The method of claim 31 wherein the step of generating the interest image comprises:

(a) filtering the satellite visible meteorological image to generate a large-scale-feature image; and (b) filtering the satellite visible meteorological image to generate a small-scale-feature image.

35. The method of claim 34 wherein the step of filtering the large-scale-feature image comprises low-pass filtering the satellite visible meteorological image.

36. The method of claim 34 wherein the step of filtering the small-scale-feature image comprises high-pass filtering the satellite visible meteorological image.

37. The method of claim 34 further comprising the step of filtering the satellite visible meteorological image to generate a peakiness image indicative of cumulus clouds.

38. The method of claim 37 wherein the step of filtering the satellite visible meteorological image comprises:

(a) averaging the visible satellite image to generate an average visible satellite meteorological image; and (b) subtracting the average visible satellite image from the visible satellite meteorological image.

39. The method of claim 31 further comprising the steps of:

(a) generating a forecast image identifying the likelihood of convective meteorological events at a third time by combining the growth image and a current precipitation image; and (b) advecting the combined image to the third time.

40. The method of claim 31 wherein the growth image comprises a decay image.

41. The method of claim 31 further comprising the step of classifying weather elements of the first meteorological image.

42. An apparatus for predicting near-term development of convective meteorological events comprising:

(a) means for advecting a first meteorological image and combining the advected first meteorological image and a second meteorological image to generate a difference image, the first and second meteorological images indicative of a first forecast parameter at a first time and a second time, respectively;

(b) filter means for generating an interest image comprising a region of interest by filtering a third meteorological image; and (c) means for combining the difference image and the interest image to generate a growth image indicative of the occurrence of a convective meteorological event.

43. The apparatus of claim 42 wherein the filter means comprises:

(a) a large-scale feature detector means for filtering the third meteorological image to generate a large-scale-feature image; and (b) a small-scale feature detector means for filtering the third meteorological image to generate a small-scale-feature image.

44. The apparatus of claim 43 wherein the large-scale feature detector comprises low-pass filter means for generating a low-pass filtered rendition of the third meteorological image.

45. The apparatus of claim 43 wherein the small-scale feature detector comprises high-pass filter means for generating a high-pass filtered rendition of the third meteorological image.

46. The apparatus of claim 42 wherein the filter means further comprises a peakiness feature-detector means for generating a peakiness image indicative of cumuliform features.

47. The apparatus of claim 42 wherein the growth image comprises a decay image.

48. The apparatus of claim 43 further comprising a means for classifying weather elements of the first meteorological image.

49. An apparatus for predicting the near-term development of convective meteorological events comprising:

an image receiver processor configured to receive a first and a second meteorological image;

a difference processor in communication with the image receiver processor, the difference processor determining a difference image in response to the first and second meteorological images;

an interest image processor in communication with the image receiver processor, the interest image processor determining an interest image in response to the first meteorological image;

a growth image processor in communication with the difference processor and the interest image processor, the growth image processor generating a growth image in response to the difference image and the interest image; and a forecast processor in communication with the growth image processor and the image receiver processor, the forecast processor determining a short-term forecast in response to the first meteorological image and the growth image.

50. The apparatus of claim 49 wherein the interest image processor comprises:

a large-scale spatial filter; and a small-scale spatial filter.

51. The apparatus of claim 49 wherein the forecast processor receives weather-classification information from the interest image processor and determines a short-term forecast in response to the first meteorological image, the growth image, and the weather-classification information.

* * * * *